(12) United States Patent
Lockett et al.

(10) Patent No.: US 11,511,500 B2
(45) Date of Patent: Nov. 29, 2022

(54) MOLDING SYSTEM AND METHODS FOR FORMING STRUCTURES

(71) Applicant: The Boeing Company, Chicago, IL (US)

(72) Inventors: Peter Lockett, Port Melbourne (AU); Manning Scarfe, Ascot Vale (AU)

(73) Assignee: The Boeing Company, Chicago, IL (US)

( * ) Notice: Subject to any disclaimer, the term of this patent is extended or adjusted under 35 U.S.C. 154(b) by 416 days.

(21) Appl. No.: 16/593,668

(22) Filed: Oct. 4, 2019

(65) Prior Publication Data
US 2021/0101349 A1 Apr. 8, 2021

(51) Int. Cl.
*B29C 70/44* (2006.01)
*B29C 70/36* (2006.01)
*B29K 105/08* (2006.01)

(52) U.S. Cl.
CPC ............ *B29C 70/443* (2013.01); *B29C 70/36* (2013.01); *B29K 2105/0872* (2013.01)

(58) Field of Classification Search
CPC ..... B29C 70/44; B29C 43/3642; B29C 43/10; B29C 2043/3647; B29C 70/342; B30B 9/22
See application file for complete search history.

(56) References Cited

U.S. PATENT DOCUMENTS

| | | | | |
|---|---|---|---|---|
| 1,625,398 A * | 4/1927 | Schaefer | ............... | B29C 51/267 264/552 |
| 2,565,949 A * | 8/1951 | Clifford | .................. | B29C 51/28 425/389 |
| 3,309,450 A * | 3/1967 | Rodgers | .................. | B32B 27/00 156/242 |
| 3,334,383 A * | 8/1967 | Irvine | ..................... | B29C 51/28 425/389 |
| 3,566,650 A * | 3/1971 | Johnson | ................. | B21D 22/12 425/389 |
| 3,935,358 A * | 1/1976 | Wyeth | ....................... | B32B 3/30 428/167 |
| 3,964,958 A * | 6/1976 | Johnston | ............... | B29C 66/345 100/211 |
| 4,192,701 A * | 3/1980 | Martin | .................. | B29C 51/082 264/296 |
| 4,943,222 A * | 7/1990 | Nathoo | ..................... | B28B 7/12 425/395 |
| 4,961,700 A * | 10/1990 | Dunbar | .................. | B29C 70/48 425/398 |
| 5,108,532 A * | 4/1992 | Thein | .................. | B32B 37/1009 156/308.2 |

(Continued)

OTHER PUBLICATIONS

Extended European Search Report, dated Feb. 16, 2021, regarding Application No. 20199875.4, 7 pages.

*Primary Examiner* — Matthew J Daniels
(74) *Attorney, Agent, or Firm* — Yee & Associates, P.C.

(57) ABSTRACT

A molding system and methods of forming a structure are presented. The molding system is configured to sequentially form features of a structure. The molding system comprises a first tool comprising a number of features configured to completely form a first set of radii of a structure and a number of partial forming features configured to partially form a second set of radii of the structure, and a second tool comprising a number of completion features configured to complete shaping of the second set of radii.

20 Claims, 14 Drawing Sheets

(56) References Cited

U.S. PATENT DOCUMENTS

| | | | | |
|---|---|---|---|---|
| 5,151,277 A | * | 9/1992 | Bernardon | B29C 70/443 |
| | | | | 249/161 |
| 5,156,795 A | * | 10/1992 | Harvey | B29C 70/542 |
| | | | | 264/510 |
| 5,192,560 A | * | 3/1993 | Umetsu | B29C 33/302 |
| | | | | 249/161 |
| 5,322,665 A | * | 6/1994 | Bernardon | B29C 70/44 |
| | | | | 264/316 |
| 5,407,610 A | * | 4/1995 | Kohama | B29C 70/44 |
| | | | | 264/516 |
| 9,770,874 B2 | * | 9/2017 | Häffelin | B29C 70/542 |
| 10,336,014 B2 | | 7/2019 | Stawski | |
| 2014/0175709 A1 | * | 6/2014 | Blackburn | B29C 51/10 |
| | | | | 264/554 |
| 2014/0225296 A1 | * | 8/2014 | Preisler | B29C 43/18 |
| | | | | 264/101 |
| 2014/0284836 A1 | | 9/2014 | Kline et al. | |

* cited by examiner

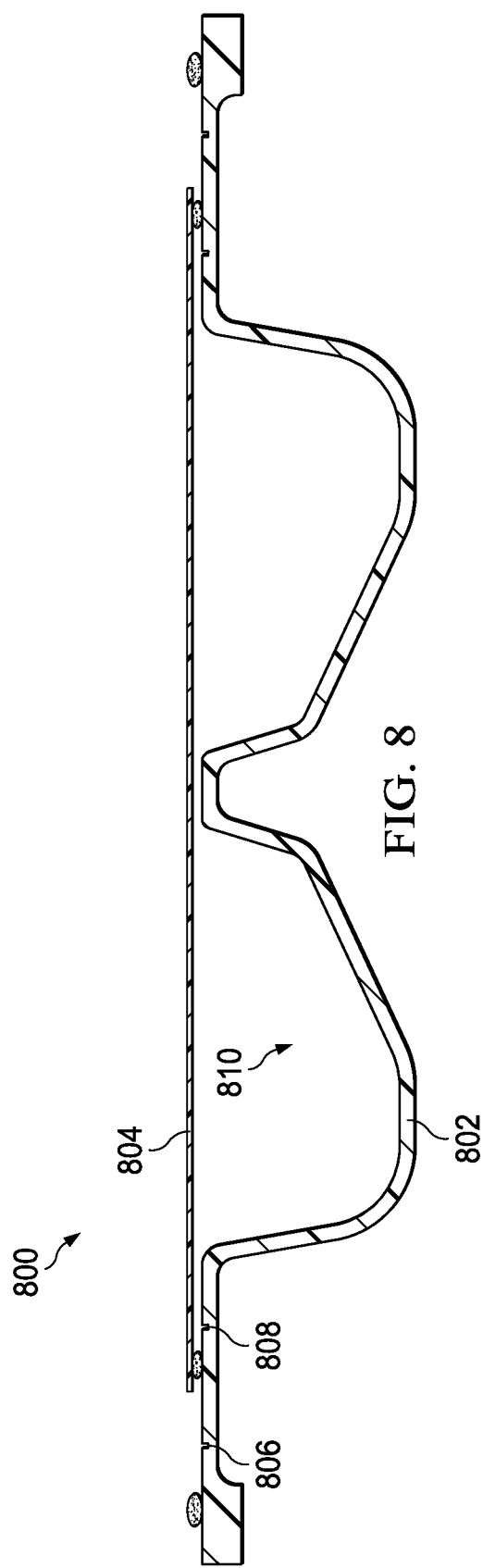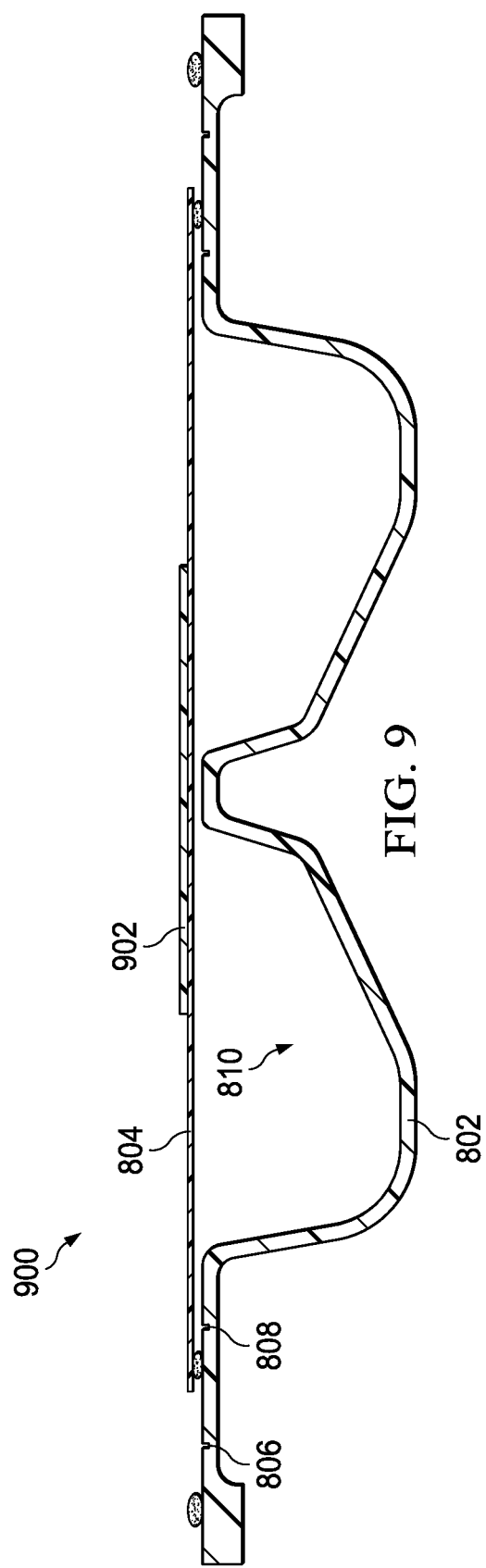

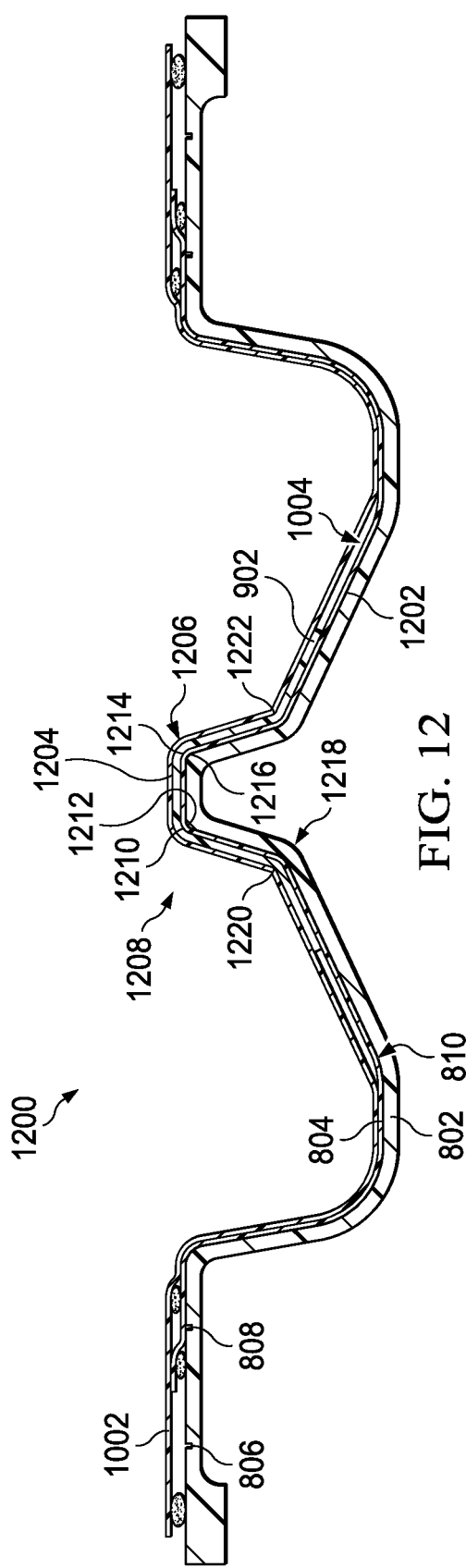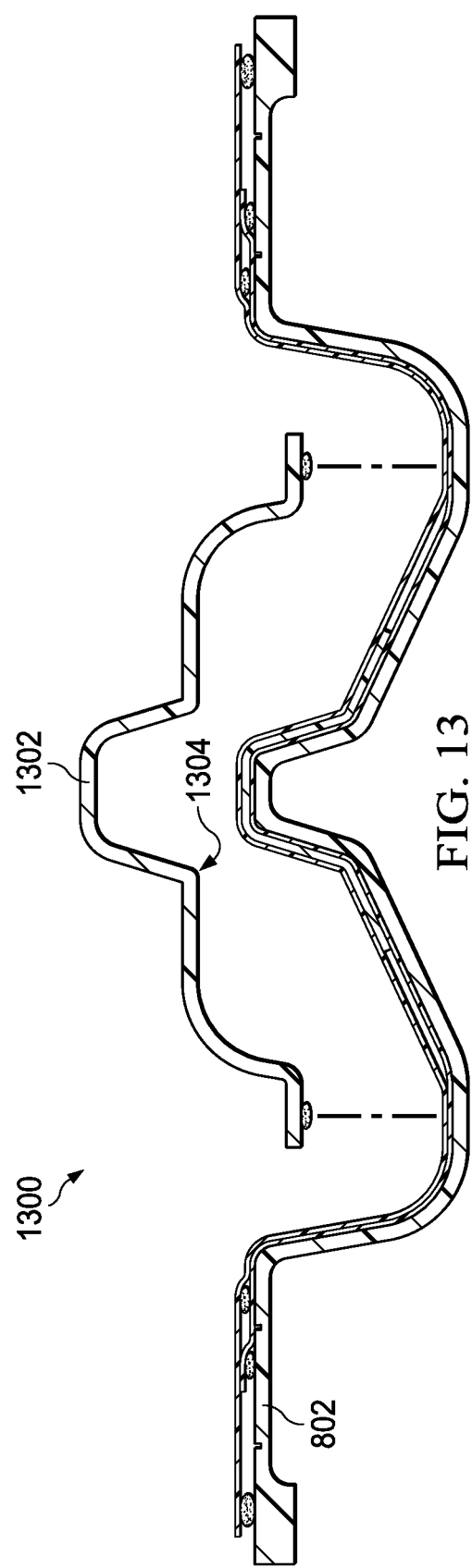

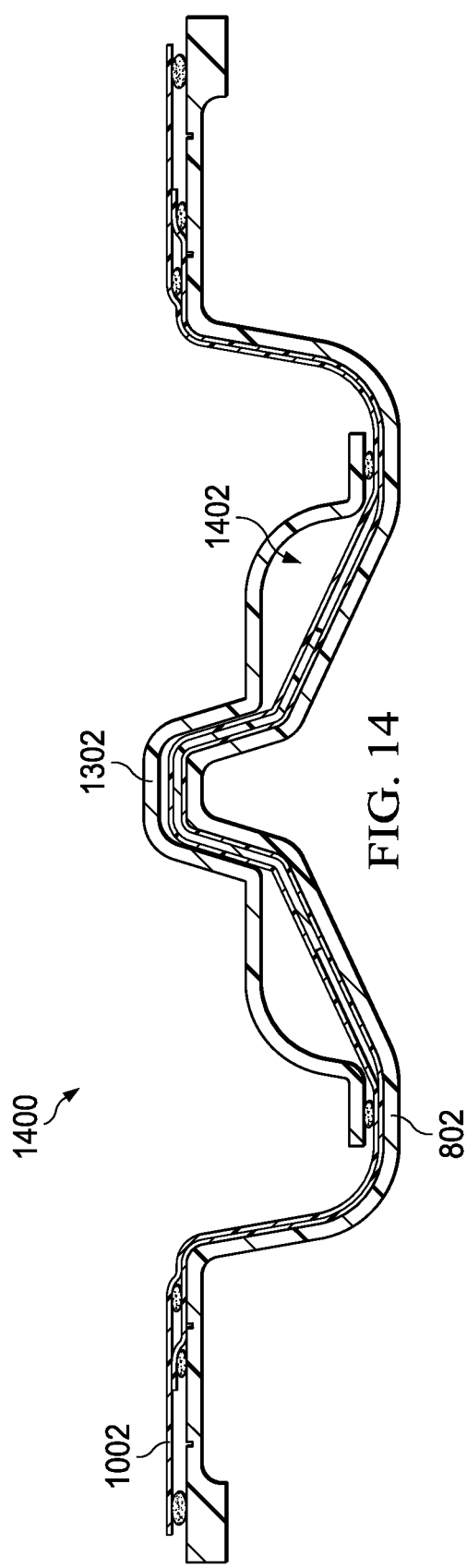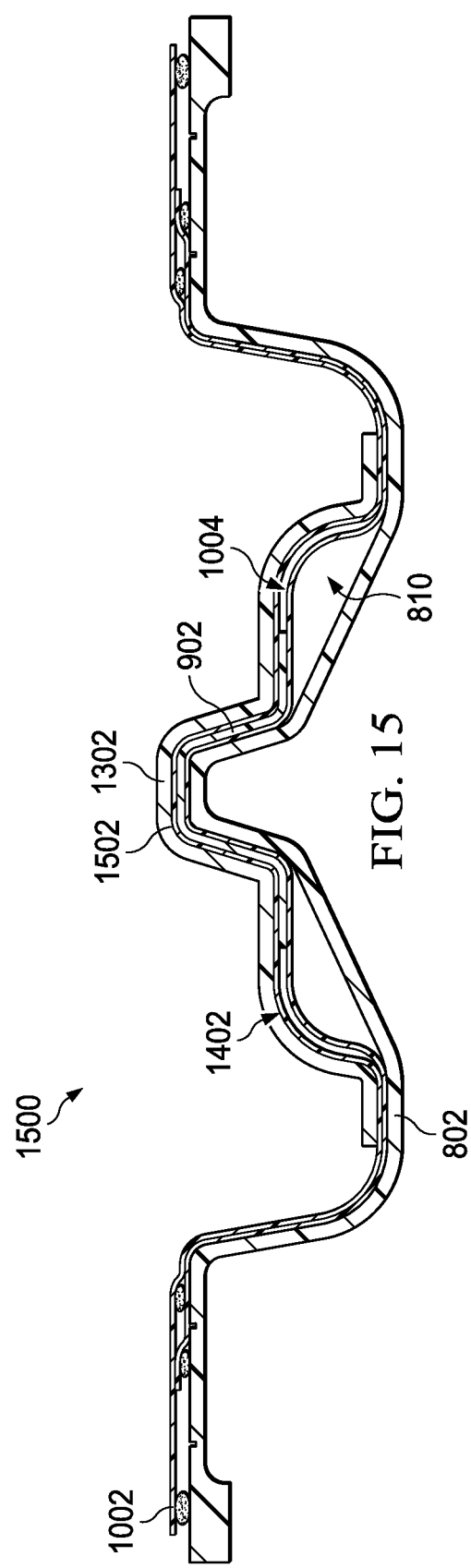

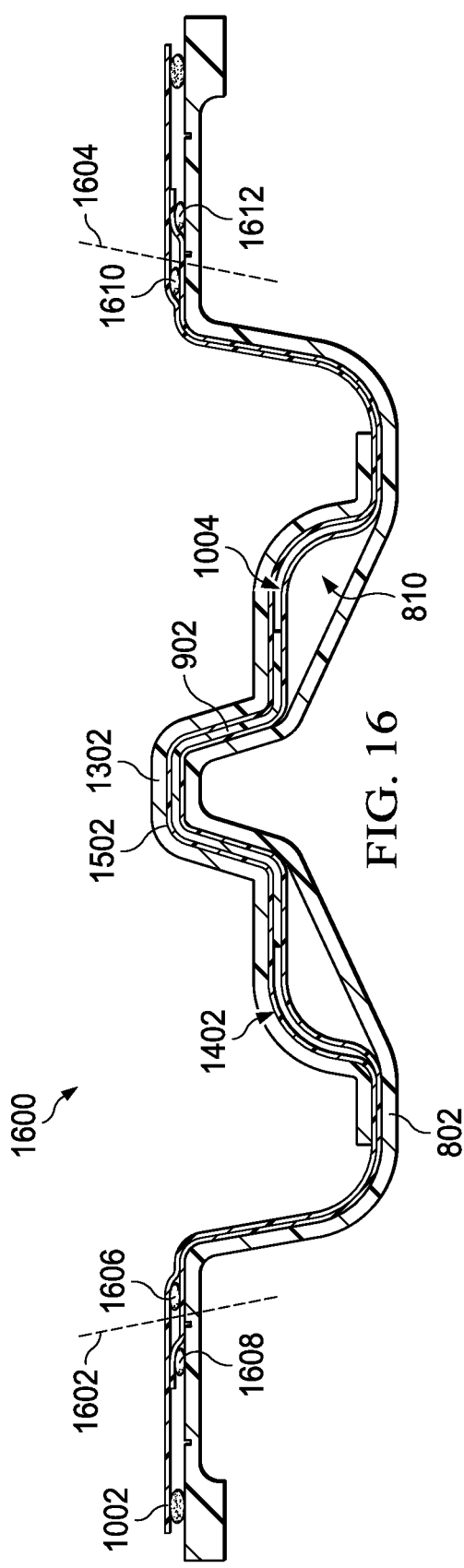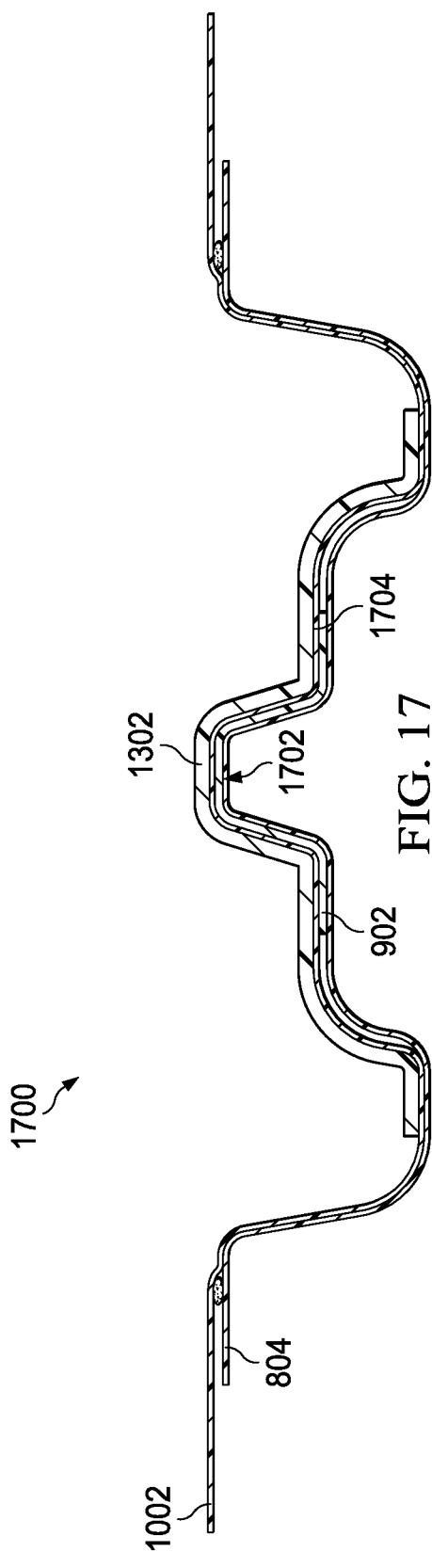

MOLDING SYSTEM AND METHODS FOR FORMING STRUCTURES

BACKGROUND INFORMATION

1. Field

The present disclosure relates generally to forming structures and more specifically to shaping a preform using a molding system.

2. Background

Some composite structures, such as composite stiffeners, have complex curvatures along their length. Additionally, some composite structures, such as composite stiffeners, have non-planar cross-sections. Composite stiffeners can have C-shaped, T-shaped, hat-shaped, or other desirably shaped cross-sections.

Hat-shaped sections are conventionally formed using one of ply by ply hand layup or stamping using matched male and female tools. Ply by ply hand layup involves sweeping each ply into each radius. Ply by ply hand layup is undesirably labor intensive, involves considerable skill, and could be ergonomically undesirable. As a result, ply by ply hand layup has at least one of an undesirably long time or an undesirably high manufacturing cost.

Stamping using matched male and female tools is performed on an initial substantially flat layup. However, stamping is typically utilized with relatively simple geometries. Material bulk factor and manufacturing tolerances can cause inconsistencies when applying stamping to large or complex parts.

Therefore, it would be desirable to have a method and apparatus that takes into account at least some of the issues discussed above, as well as other possible issues.

SUMMARY

An embodiment of the present disclosure provides a molding system configured to sequentially form features of a structure. The molding system comprises a first tool comprising a number of features configured to completely form a first set of radii of a structure and a number of partial forming features configured to partially form a second set of radii of the structure, and a second tool comprising a number of completion features configured to complete shaping of the second set of radii.

Another embodiment of the present disclosure provides a method of forming a composite structure. A portion of a cross-section of the structure is formed into a preform using a first tool. A remainder of the cross-section of the structure is formed into the preform using a second tool positioned above the first tool by at least partially evacuating a vacuum chamber between the second tool and the preform.

Yet another embodiment of the present disclosure provides a method of forming a structure. A first bagging layer is sealed to a first tool. A second bagging layer is sealed to the first tool while a preform is between the first bagging layer and the second bagging layer. A first vacuum chamber formed by the first bagging layer and the first tool is at least partially evacuated to form the preform to a forming surface of the first tool. A second tool is sealed to the second bagging layer to form a third vacuum chamber between the second tool and the second bagging layer. The third vacuum chamber is at least partially evacuated to form the preform to a forming surface of the second tool.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of a cross-sectional view of a first bagging layer sealed to a first tool of a molding system in accordance with an illustrative embodiment;

FIG. 9 is an illustration of a cross-sectional view of a preform placed onto a first bagging layer sealed to a first tool of a molding system in accordance with an illustrative embodiment;

FIG. 12 is an illustration of a cross-sectional view of a preform between a first bagging layer and a second bagging layer, both sealed to a first tool of a molding system with an at least partially evacuated first vacuum chamber formed by a first bagging layer and a first tool in accordance with an illustrative embodiment;

FIG. 13 is an illustration of a cross-sectional view of a second tool aligned over a preform between a first bagging layer and a second bagging layer and formed to a first tool of a molding system in accordance with an illustrative embodiment;

FIG. 14 is an illustration of a cross-sectional view of a second tool sealed to a second bagging layer over a preform sealed between a first bagging layer and the second bagging layer and formed to a first tool of a molding system in accordance with an illustrative embodiment;

FIG. 15 is an illustration of a cross-sectional view of a preform formed to a second tool when a third vacuum chamber between the second tool and a second bagging layer over the preform is at least partially evacuated in accordance with an illustrative embodiment;

FIG. 16 is an illustration of a cross-sectional view of trim locations to release a first tool of a molding system from a preform formed to a second tool above the first tool in accordance with an illustrative embodiment;

FIG. 17 is an illustration of a preform formed to a second tool in accordance with an illustrative embodiment;

DETAILED DESCRIPTION

Figure 1:
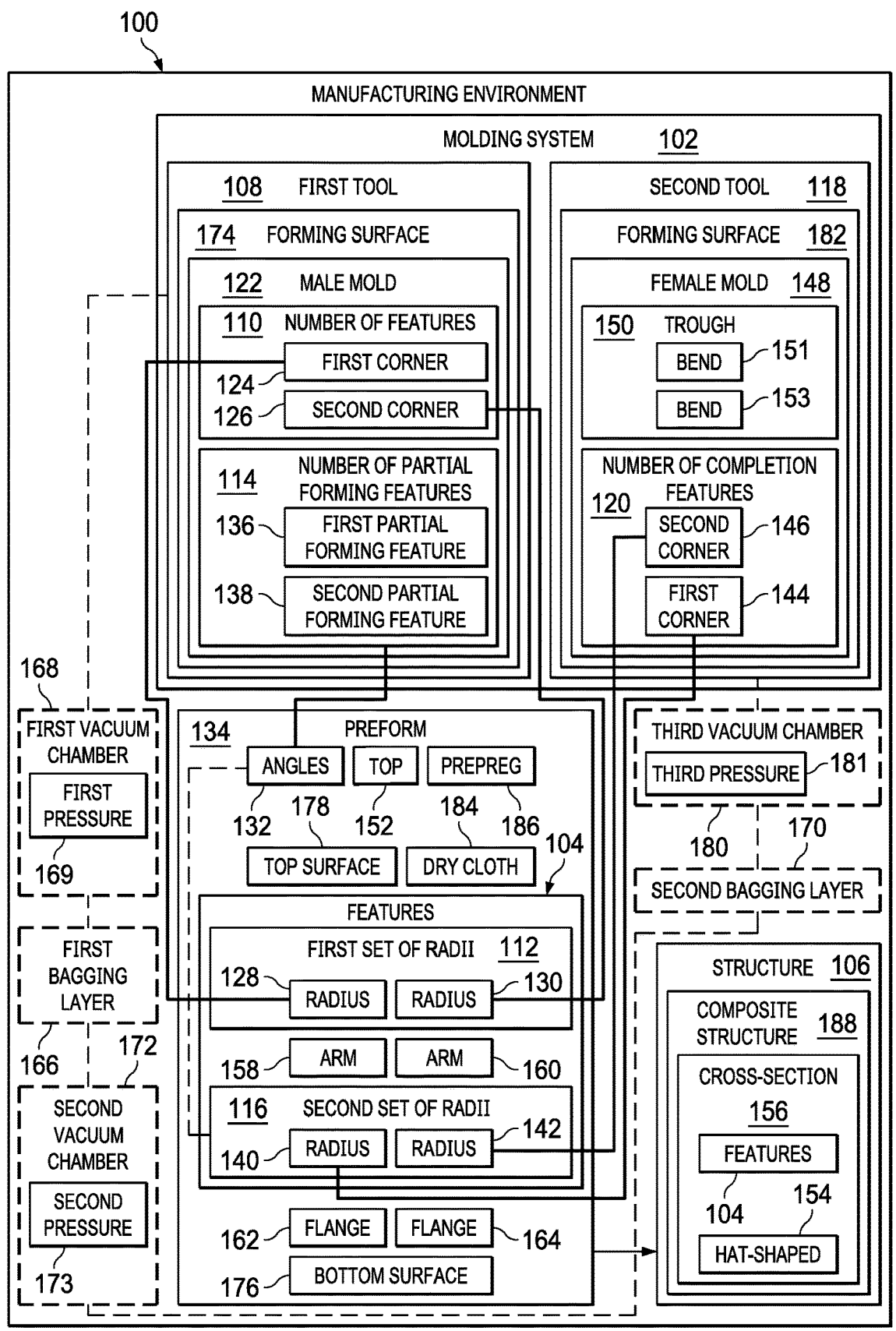
FIG. 1 is an illustration of a block diagram of a manufacturing environment in which an illustrative embodiment may be implemented.

The illustrative embodiments recognize and take into account one or more different considerations. The illustrative embodiments recognize and take into account that ply by ply hand layup relies on each ply remaining in position after being formed into any female bends. However, for a dry material system the material will not remain in the female bends. The illustrative embodiments recognize and take into account that ply by ply hand layup for pre-preg systems may have varied success depending on operator skill and material tack.

Stamping between male and female tools utilizes large forces and hard tooling to force the layup stack into the shape presented by the cavity between matched tools. As such, the structural fibers may be damaged or broken when being forced into a contour the fibers would not naturally drape into. Damage is especially likely if fibers have already formed around and/or onto particular features and are subsequently being forced into another feature while the cavity is reducing in size due to the tools closing together. For example, if fibers have already formed to a first set of radii of a hat-shaped cross-section, being forced into the second set of radii while the cavity is reducing in size may cause inconsistencies.

The illustrative embodiments recognize and take into account that vacuum forming may be used to pull a composite preform against a male mold. The illustrative embodiments recognize and take into account that existing vacuum forming methods for composite stiffeners are limited to C-sections due to inconsistencies with existing vacuum forming or hot drape forming of more complex parts, such as bridging, wrinkles, or radius thinning.

The illustrative embodiments recognize and take into account that double diaphragm forming may be used in forming C-shaped cross-sections. Double diaphragm forming utilizes simplified initial layup of flat (or single curvature) charges. Double diaphragm forming provides a forming technique that allows for greater control of or prevention of inconsistencies and reduction of manual operations which increase labor cost.

The illustrative embodiments recognize and take into account that applying known diaphragm forming methods to a hat-shaped cross-section would result in the layup having to form over a male radius (web to hat-top radius) and then a female radius (web to flange radius). Forming a hat-shaped cross-section using a known conventional diaphragm method would likely not be successful as the diaphragm would not form into the female radius and would "bridge" across it.

The illustrative examples provide a molding system and methods to implement advantages of diaphragm forming for more complex cross-sectional shapes. The illustrative examples provide a method of initially forming a diaphragm over a male radius and then re-forming the diaphragm in an opposite direction over a male radius of a second tool in a molding system to perform two-stage forming. The illustrative examples provide advantages of a double diaphragm forming process for a more complex configuration than previously possible.

Turning now to FIG. 1, an illustration of a block diagram of a manufacturing environment is depicted in which an illustrative embodiment may be implemented. Manufacturing environment 100 is an environment in which molding system 102 is used to sequentially form features 104 of structure 106.

Molding system 102 comprises first tool 108 comprising number of features 110 configured to completely form first set of radii 112 of structure 106 and number of partial forming features 114 configured to partially form second set of radii 116 of structure 106, and second tool 118 comprising number of completion features 120 configured to complete shaping of second set of radii 116. As used herein a "number of" items means one or more items. For example, number of features 110 is one or more features.

As depicted, first tool 108 comprises male mold 122 having number of features 110. In this illustrative example, number of features 110 comprises first corner 124 and second corner 126. In this illustrative example, first corner 124 is configured to shape radius 128 of first set of radii 112. First corner 124 shapes radius 128 to its final desired shape. In this illustrative example, second corner 126 is configured to shape radius 130 of first set of radii 112. Second corner 126 shapes radius 130 to its final desired shape.

Number of partial forming features 114 is configured to form angles 132 into preform 134, wherein the angles are larger than final angles of second set of radii 116 of structure 106. By forming angles 132, first tool 108 begins forming a portion of preform 134 prior to completing second set of radii 116.

In this illustrative example, number of partial forming features 114 includes first partial forming feature 136 and second partial forming feature 138. First partial forming feature 136 forms an angle of angles 132 that begins forming radius 140 of second set of radii 116. Second partial forming feature 138 forms an angle of angles 132 that begins forming radius 142 of second set of radii 116.

Number of completion features 120 comprises first corner 144 and second corner 146. First corner 144 is configured to continue forming an angle of angles 132 initially formed by first partial forming feature 136. Second corner 146 is configured to continue forming an angle of angles 132 initially formed by second partial forming feature 138.

First corner 144 is configured to form radius 140 of second set of radii 116. Second corner 146 is configured to form radius 142 of second set of radii.

Second tool 118 is female mold 148 having trough 150 configured to support first set of radii 112 of structure 106. Trough 150 maintains the final shape of features 104 of structure 106 formed into preform 134 by first tool 108. For example, top 152 is supported in its final shape by trough

150. Bend 151 of trough 150 supports radius 128 formed by first corner 124. Bend 153 of trough 150 supports radius 130 formed by second corner 126.

In this illustrative example, first tool 108 and second tool 118 are configured to form structure 106 having hat-shaped 154 cross-section 156. Hat-shaped 154 cross-section 156 includes top 152, first set of radii 112, arm 158, and arm 160 formed by first tool 108 as well as second set of radii 116, flange 162, and flange 164 formed by second tool 118. Radius 140 connects flange 162 and arm 158. Radius 142 connects flange 164 and arm 160. Radius 128 connects arm 158 and top 152. Radius 130 connects arm 160 and top 152.

In some illustrative examples, a portion of cross-section 156 of structure 106 is formed into preform 134 using first tool 108, and a remainder of cross-section 156 of structure 106 is formed into preform 134 using second tool 118 positioned above first tool 108 by at least partially evacuating a vacuum chamber between second tool 118 and preform 134. When the vacuum chamber is at least partially evacuated, the pressure within the vacuum chamber is reduced. When the vacuum chamber is at least partially evacuated, vacuum chamber is partially or fully evacuated. In some of these illustrative examples, the portion of cross-section 156 formed using first tool 108 includes first set of radii 112 formed into preform 134 using first tool 108. In some of these illustrative examples, the remainder of cross-section 156 of structure 106 formed into preform 134 using second tool 118 includes second set of radii 116.

Prior to forming features 104 into preform 134, first bagging layer 166 is sealed to first tool 108. Sealing first bagging layer 166 to first tool 108 forms first vacuum chamber 168. First pressure 169 is the pressure within first vacuum chamber 168.

Preform 134 is placed onto first bagging layer 166 either prior to or following sealing first bagging layer 166 to first tool 108. Second bagging layer 170 is positioned over preform 134. Second bagging layer 170 is sealed to first tool 108 while preform 134 is between first bagging layer 166 and second bagging layer 170. Sealing second bagging layer 170 to first tool 108 forms second vacuum chamber 172. Second pressure 173 is the pressure within second vacuum chamber 172.

First pressure 169 within first vacuum chamber 168 formed by first bagging layer 166 and first tool 108 is lowered to form preform 134 to forming surface 174 of first tool 108. In these illustrative examples, first vacuum chamber 168 formed by first bagging layer 166 and first tool 108 is at least partially evacuated to form preform 134 to forming surface 174 of first tool 108.

As first vacuum chamber 168 is at least partially evacuated, second pressure 173 within second vacuum chamber 172 is controlled to reduce or eliminate wrinkles in preform 134. As first vacuum chamber 168 is at least partially evacuated, second pressure 173 within second vacuum chamber 172 is controlled to maintain a desired quality in preform 134.

Forming preform 134 to forming surface 174 of first tool 108 comprises forming first set of radii 112 using number of features 110 of forming surface 174 of first tool 108. Forming preform 134 to forming surface 174 of first tool 108 further comprises partially forming second set of radii 116 using number of partial forming features 114 of forming surface 174 of first tool 108. Partially forming second set of radii 116 forms angles 132 with greater radii than radius 140 and radius 142.

As preform 134 is formed to forming surface 174 of first tool 108, bottom surface 176 of preform 134 is in contact with first bagging layer 166. As preform 134 is formed to forming surface 174 of first tool 108, bottom surface 176 of preform 134 faces first tool 108. As preform 134 is formed to forming surface 174 of first tool 108, top surface 178 of preform 134 is in contact with second bagging layer 170. Top surface 178 is opposite bottom surface 176.

Second tool 118 is sealed to second bagging layer 170 to form third vacuum chamber 180 between second tool 118 and second bagging layer 170. Third pressure 181 is the pressure within third vacuum chamber 180.

Third pressure 181 in third vacuum chamber 180 is reduced to form preform 134 to forming surface 182 of the second tool 118. In these illustrative examples, third vacuum chamber 180 is at least partially evacuated to form preform 134 to forming surface 182 of the second tool 118. Forming preform 134 to forming surface 182 of second tool 118 comprises completing second set of radii 116 using number of completion features 120 of forming surface 182 of second tool 118.

After forming second set of radii 116, preform 134 is treated to hold features 104. In some illustrative examples, preform 134 is heated to maintain features 104 in preform 134. In some illustrative examples, preform 134 may be held at ambient temperature until preform 134 is firm enough to maintain features 104.

In some illustrative examples, first bagging layer 166 is sealed to first tool 108 while preform 134 is treated to hold features 104. In some illustrative examples, first bagging layer 166 and second bagging layer 170 are trimmed such that first tool 108 is removed from first bagging layer 166 prior to treating preform 134. In these illustrative examples, first tool 108 may be used to begin forming a second preform as preform 134 is being treated. As depicted, first tool 108 is male mold 122 and second tool 118 is female mold 148.

Preform 134 takes the form of a composite material or a composite precursor. In some illustrative examples, preform 134 is dry cloth 184. When preform 134 is dry cloth 184, dry cloth 184 will be infused with resin after forming. In some illustrative examples, preform 134 is prepreg 186. In some illustrative examples when preform 134 is prepreg 186, prepreg 186 is heated prior to forming preform 134 to forming surface 174 of first tool 108.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although number of partial forming features 114 is depicted as including two partial forming features, in other illustrative examples partial forming features 114 has more than two partial forming features. For example, although number of partial forming features 114 is depicted as including two partial forming features, in other illustrative examples partial forming features 114 has only one partial forming feature.

Figure 2:
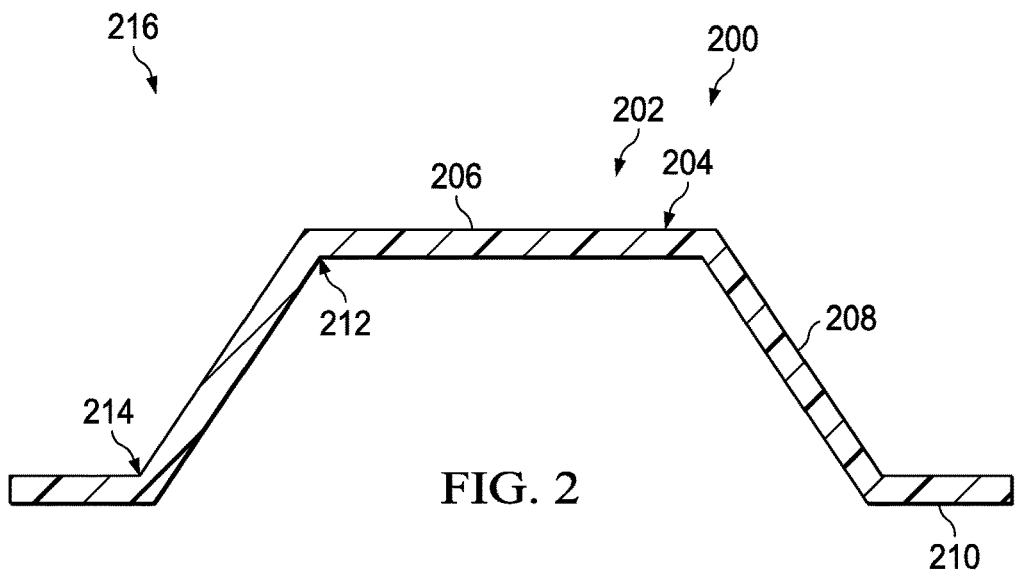
FIG. 2 is an illustration of a cross-sectional view of a composite structure in accordance with an illustrative embodiment.

Turning now to FIG. 2, an illustration of a cross-sectional view of a composite structure is depicted in accordance with an illustrative embodiment. Composite structure 200 is a physical implementation of composite structure 188 of FIG. 1. Composite structure 200 may also be referred to as a stiffener or a stringer. Composite structure 200 has cross-section 202 that is hat-shaped 204. Composite structure 200 has top 206, arms 208, and flanges 210. First set of radii 212 is positioned between top 206 and arms 208. Second set of radii 214 is positioned between arms 208 and flanges 210.

As can be seen in view 216, first set of radii 212 is convex when viewed from top 206. As can be seen in view 216, second set of radii 214 is concave when viewed from top 206.

Although view 216 only shows cross-section 202, additional three-dimensional shape is present in composite structure 200. For example, composite structure 200 may also have curvature, twists, or other three-dimensional complex shapes as composite structure 200 moves into or out of the page. The curvature, twists, or other three-dimensional complex shapes are independent of cross-section 202. Additional three-dimensional shape as composite structure 200 moves into and out of the page is related to surrounding structures. For example, when composite structure 200 will be joined to a surrounding structure, the curvature of the surrounding structure influences the curvature of composite structure 200 such that composite structure 200 will follow the curvature of the surrounding structure.

Figure 3:
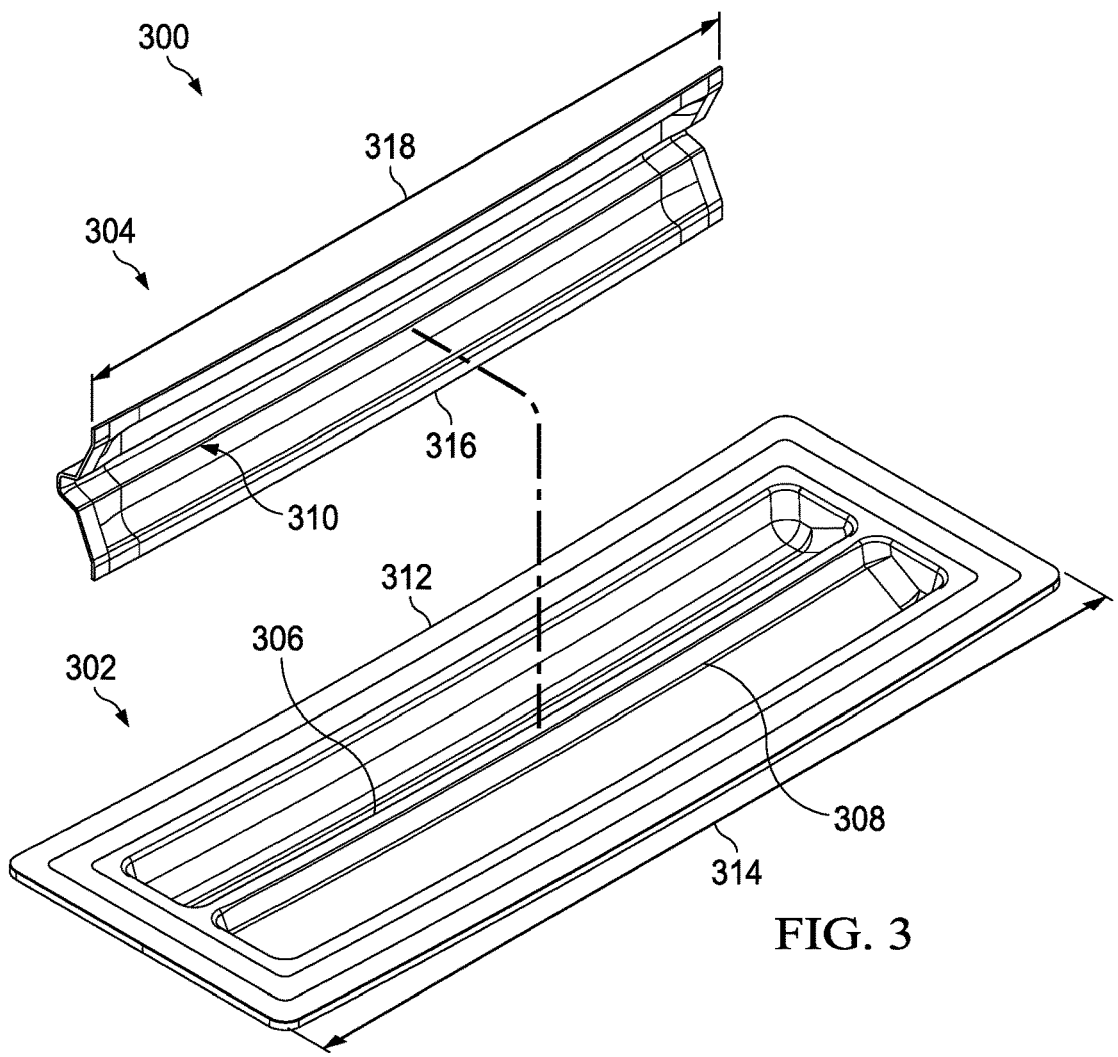
FIG. 3 is an illustration of an isometric view of a molding system in accordance with an illustrative embodiment.

Turning now to FIG. 3, an illustration of an isometric view of a molding system is depicted in accordance with an illustrative embodiment. Molding system 300 is a physical implementation of molding system 102 of FIG. 1. Molding system 300 may be used to form composite structure 200.

Molding system 300 is configured to sequentially form features of a structure, such as composite structure 200. Molding system 300 comprises first tool 302 and second tool 304. First tool 302 comprises number of features 306 configured to completely form a first set of radii of a structure and number of partial forming features 308 configured to partially form a second set of radii of the structure. Second tool 304 comprises number of completion features 310 configured to complete shaping of the second set of radii.

As depicted, first tool 302 has curvature 312 along length 314 of first tool 302. As depicted, second tool 304 has curvature 316 along length 318 of second tool 304. Curvature 316 is the same as curvature 312 of first tool 302.

Figure 4:
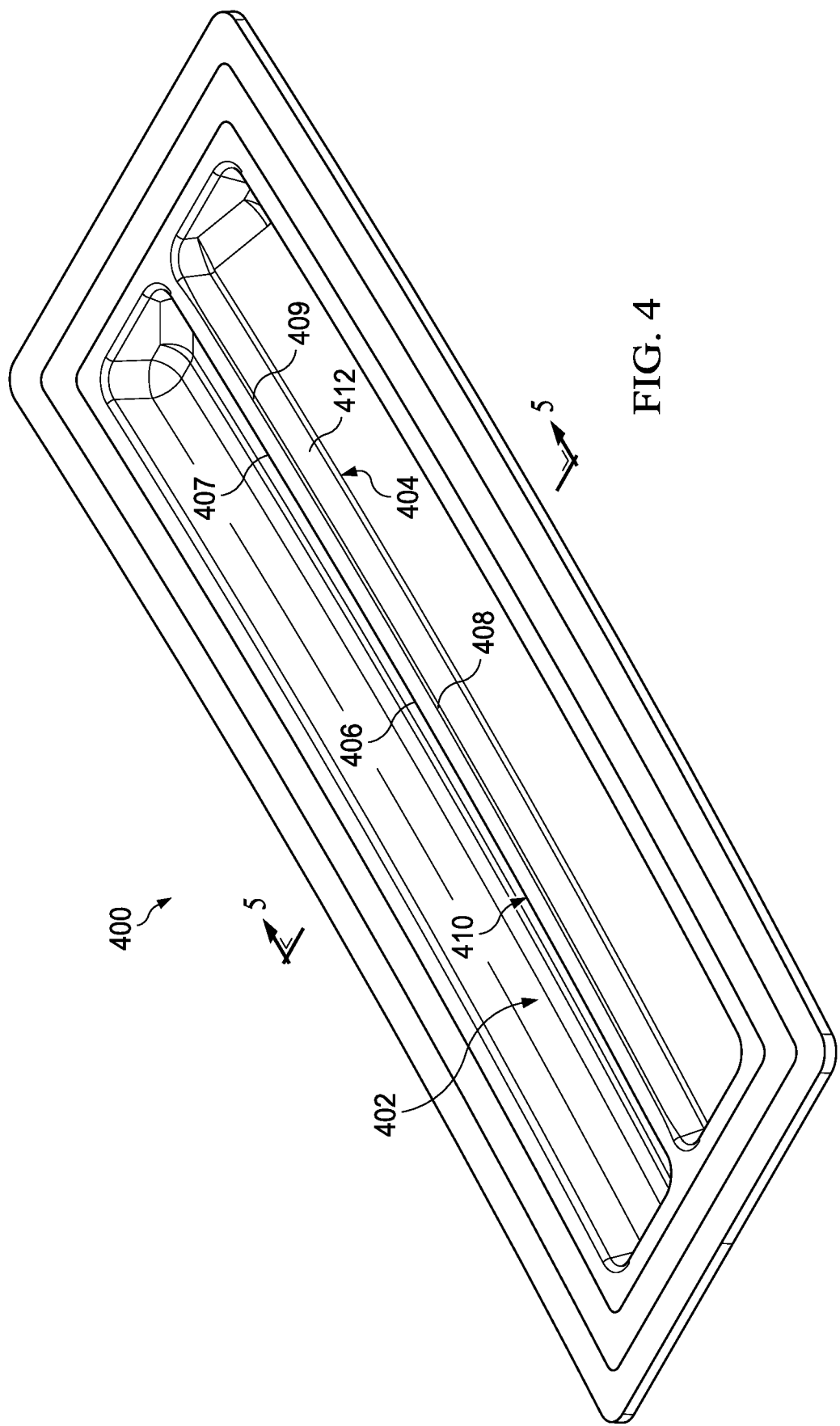
FIG. 4 is an illustration of an isometric view of a first tool of a molding system in accordance with an illustrative embodiment.

Turning now to FIG. 4, an illustration of an isometric view of a first tool of a molding system is depicted in accordance with an illustrative embodiment. First tool 400 is a physical implementation of first tool 108 of FIG. 1. In some illustrative examples, first tool 400 is used to form composite structure 200 of FIG. 2. In some illustrative examples, first tool 400 may be the same as first tool 302 of FIG. 3.

First tool 400 comprises number of features 402 configured to completely form a first set of radii of a structure and number of partial forming features 404 configured to partially form a second set of radii of the structure. Number of features 402 includes male feature 406 and male feature 408. Male feature 406 takes the form of first corner 407. Male feature 408 takes the form of second corner 409.

Partial forming features 404 includes first partial forming feature 410 and second partial forming feature 412. As depicted, first partial forming feature 410 takes the form of a female feature. First partial forming feature 410 may also be referred to as a bend. As depicted, second partial forming feature 412 takes the form of a female feature.

Figure 5:
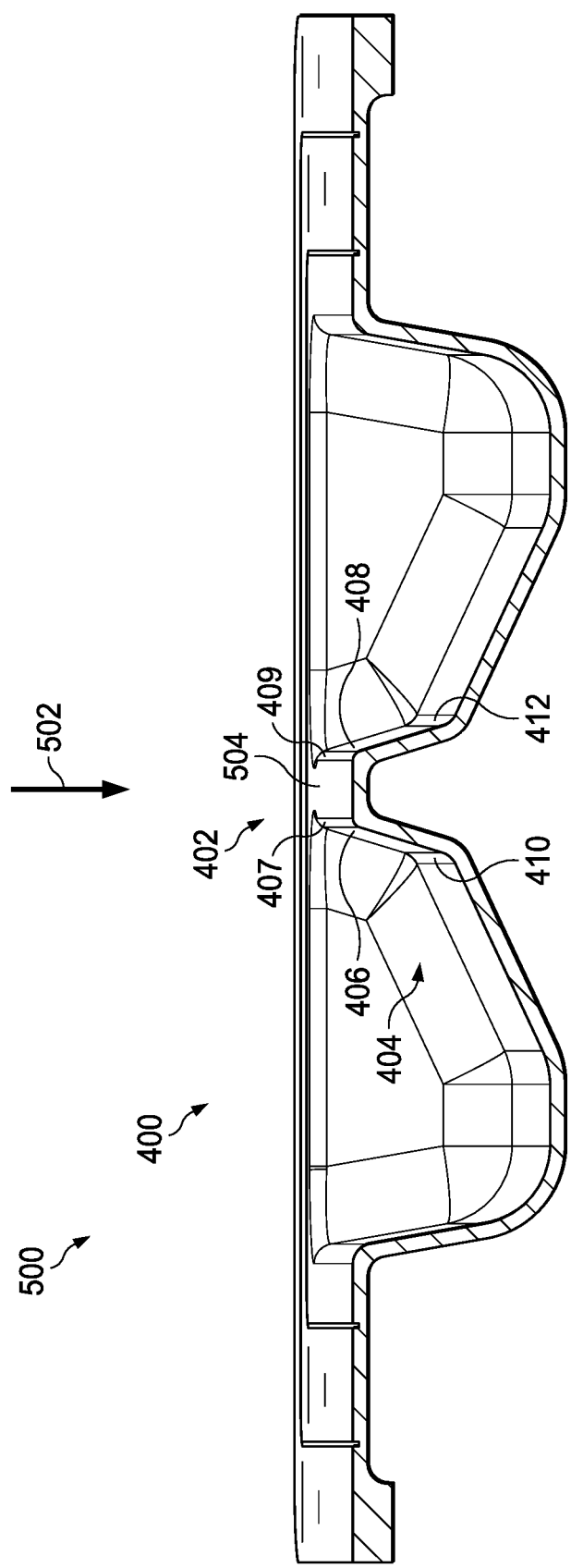
FIG. 5 is an illustration of a cross-sectional view of a first tool of a molding system in accordance with an illustrative embodiment.

Turning now to FIG. 5, an illustration of a cross-sectional view of a first tool of a molding system is depicted in accordance with an illustrative embodiment. View 500 is a cross-sectional view of first tool 400 of FIG. 4. As can be seen in view 500, number of features 402 is configured to completely form a top and first set of radii of a structure in a structure with a hat-shaped cross-section. As can be seen in view 500, partial forming features 404 are configured to partially form a second set of radii connecting arms of a structure with a hat-shaped cross-section to flanges of the structure. Partial forming features 404 partially form the second set of radii by beginning to bend a preform towards the desired radii for second set of radii without fully reaching the desired angle.

As can be seen in view 500, first tool 400 may be considered a male mold. To form a structure using first tool 400, a preform will move in direction 502 to be formed over number of features 402 and partial forming features 404. During forming, a first surface of a preform will face forming surface 504 of first tool 400.

Figure 6:
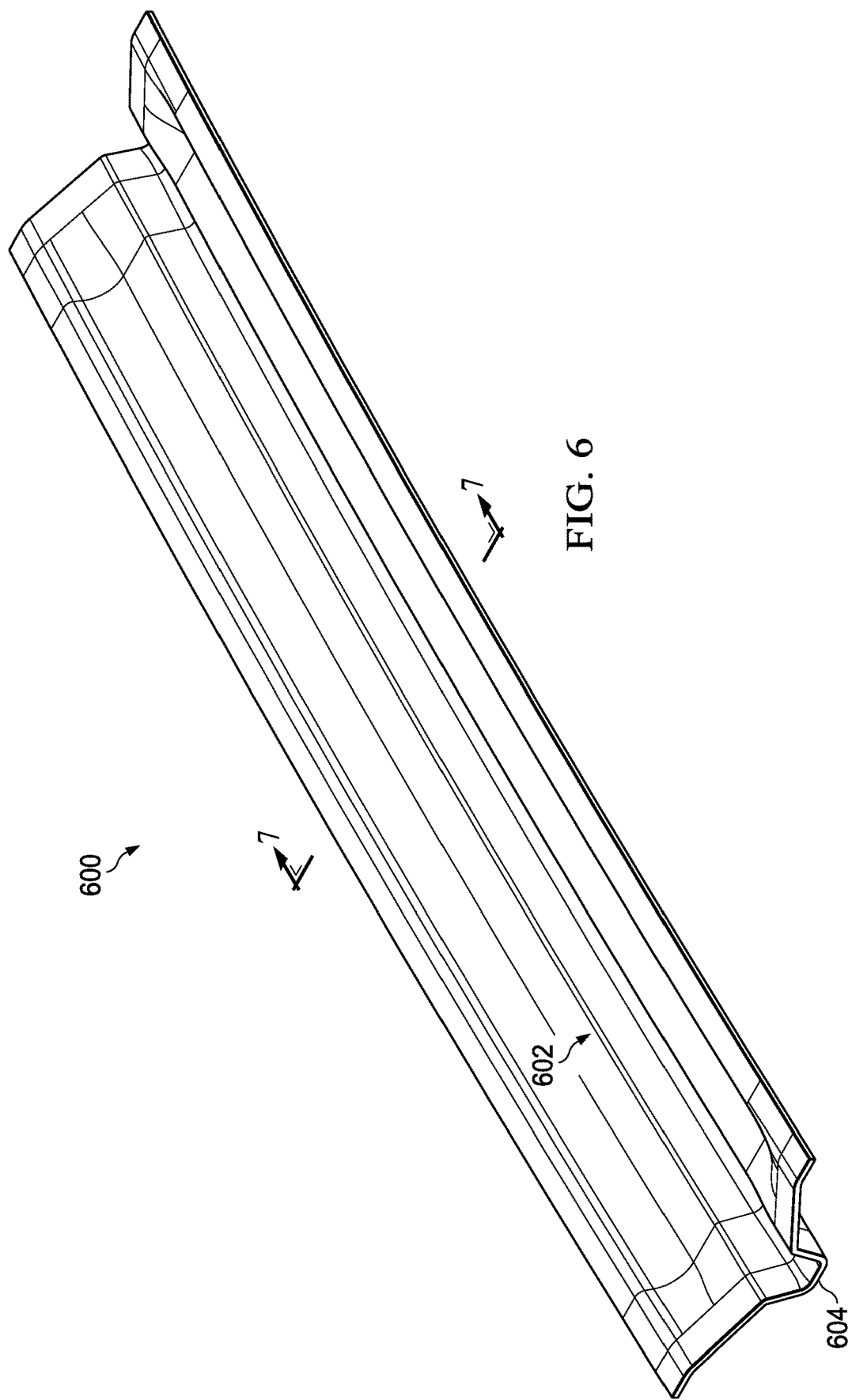
FIG. 6 is an illustration of an isometric view of a second tool of a molding system in accordance with an illustrative embodiment.

Turning now to FIG. 6, an illustration of an isometric view of a second tool of a molding system is depicted in accordance with an illustrative embodiment. Second tool 600 is a physical implementation of second tool 118 of FIG. 1. In some illustrative examples, second tool 600 is used to form composite structure 200 of FIG. 2. In some illustrative examples, second tool 600 may be the same as second tool 304 of FIG. 3.

Second tool 600 comprises number of completion features 602 configured to complete shaping of the second set of radii. Second tool 600 also has trough 604. Trough 604 is configured to support a first set of radii of a structure and maintain the shape of the first set of radii during shaping of the second set of radii.

Figure 7:
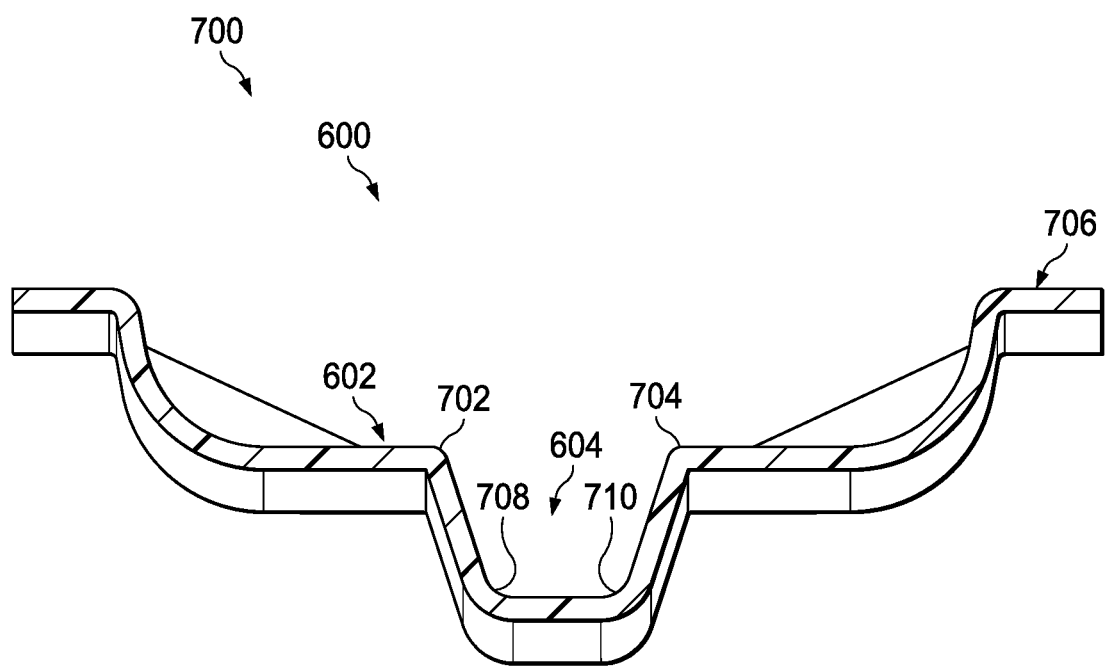
FIG. 7 is an illustration of a cross-sectional view of a second tool of a molding system in accordance with an illustrative embodiment.

Turning now to FIG. 7, an illustration of a cross-sectional view of a second tool of a molding system is depicted in accordance with an illustrative embodiment. View 700 is a cross-sectional view of second tool 600 of FIG. 6.

Number of completion features 602 comprises first corner 702 and second corner 704. First corner 702 is configured to continue forming an angle of angles initially formed by a first partial forming feature of a first tool. Second corner 704 is configured to continue forming an angle of angles initially formed by second partial forming feature of a first tool.

First corner 702 is configured to form a radius of a second set of radii of a structure. Second corner 704 is configured to form a second radius of the second set of radii of the structure.

Second tool 600 is female mold 706 having trough 604 configured to support a first set of radii of the structure. Trough 604 maintains the final shape of features of the structure formed into a preform by a first tool. For example, a top of a hat-shaped cross-section in a structure can be supported in its final shape by trough 604. Bend 708 and bend 710 of trough 604 support a first set of radii of a structure.

FIGS. 8-17 depict a series of views for forming a composite structure using a molding system. Beginning at FIG. 8, an illustration of a cross-sectional view of a first bagging layer sealed to a first tool of a molding system is depicted in accordance with an illustrative embodiment. In view 800, first tool 802 is visible. First tool 802 is a physical implementation of first tool 108 of FIG. 1. In some illustrative examples, first tool 802 is used to form composite structure 200 of FIG. 2. In some illustrative examples, first tool 802 may be the same as first tool 302 of FIG. 3. In some illustrative examples, first tool 802 may be the same as first tool 400 of FIG. 4.

In view 800, first bagging layer 804 is sealed to first tool 802. More specifically, first bagging layer 804 is sealed to first tool 802 between first channel 806 and second channel 808. Sealing first bagging layer 804 to first tool 802 forms first vacuum chamber 810.

Turning now to FIG. 9, an illustration of a cross-sectional view of a preform placed onto a first bagging layer sealed to a first tool of a molding system is depicted in accordance with an illustrative embodiment. In view 900, preform 902 is positioned on first bagging layer 804.

Figure 10:
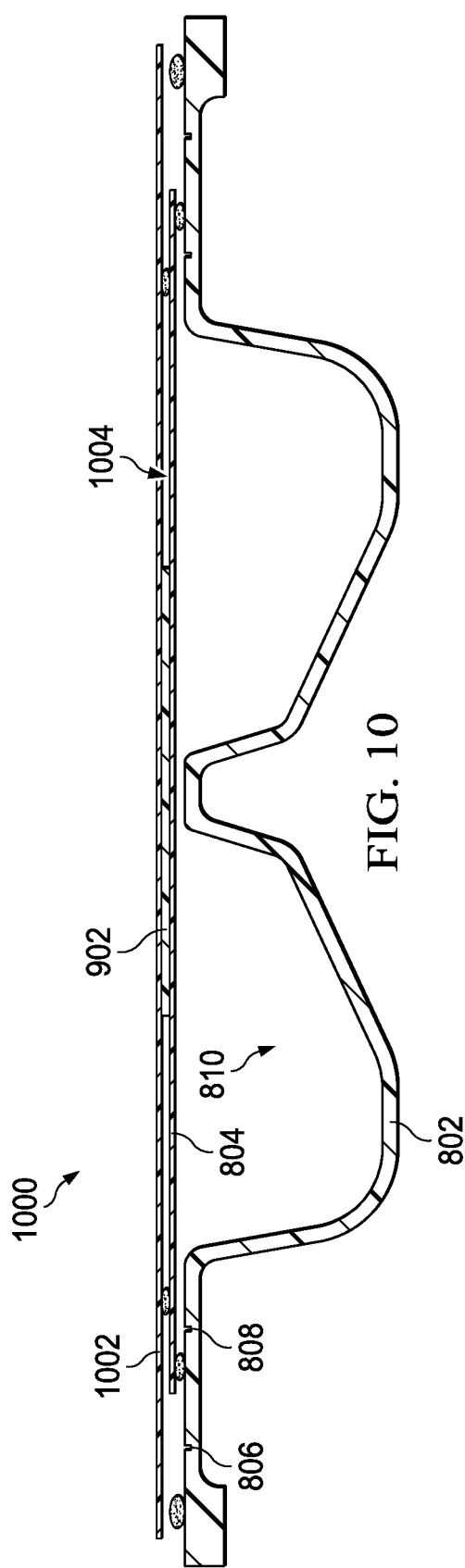
FIG. 10 is an illustration of a cross-sectional view of a second bagging layer sealed over a preform and a first bagging layer in accordance with an illustrative embodiment.

Turning now to FIG. 10, an illustration of a cross-sectional view of a second bagging layer sealed over a preform and a first bagging layer is depicted in accordance with an illustrative embodiment. In view 1000, second bagging layer 1002 is sealed to first tool 802 and first bagging layer 804. Second vacuum chamber 1004 is formed between first bagging layer 804 and second bagging layer 1002. In view 1000, second vacuum chamber 1004 is at atmospheric pressure.

Figure 11:
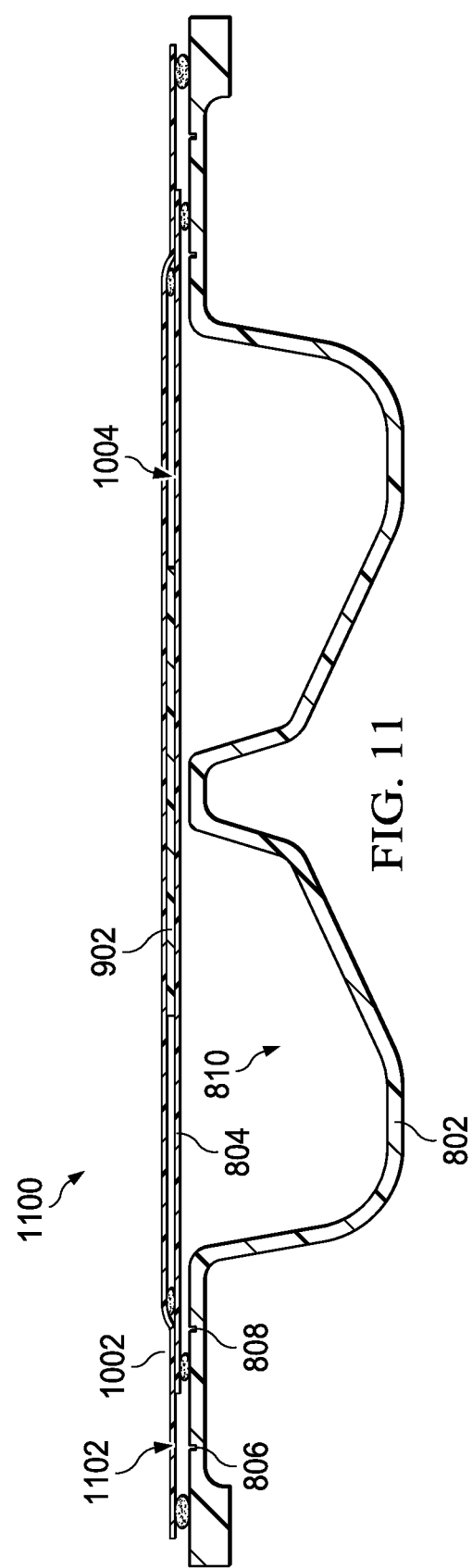
FIG. 11 is an illustration of a cross-sectional view of a preform between a first bagging layer and a second bagging layer, both sealed to a first tool of a molding system in accordance with an illustrative embodiment.

Turning now to FIG. 11, an illustration of a cross-sectional view of a preform between a first bagging layer and a second bagging layer, both sealed to a first tool of a molding system is depicted in accordance with an illustrative embodiment. In view 1100, vacuum is applied to perimeter grooves 1102.

Turning now to FIG. 12, an illustration of a cross-sectional view of a preform between a first bagging layer and a second bagging layer, both sealed to a first tool of a molding system with an at least partially evacuated first vacuum chamber formed by a first bagging layer and a first tool is depicted in accordance with an illustrative embodiment. In view 1200, pressure is controlled within first vacuum chamber 810 and second vacuum chamber 1004. In view 1200, vacuum has been drawn in first vacuum chamber 810 to form preform 902 against forming surface 1202 of first tool 802.

In view 1200, top 1204 and first set of radii 1206 have been formed by number of features 1208. Radius 1210 has been formed by corner 1212. Radius 1214 has been formed by corner 1216. Top 1204 and first set of radii 1206 are desired final shapes for a resulting structure.

In view 1200, number of partial forming features 1218 has formed radius 1220 and radius 1222. Radius 1220 and radius 1222 are intermediate radiuses. Radius 1220 and radius 1222 have larger angles than a desired final radius within the second set of radii of a resulting structure. Number of partial forming features 1218 has formed preform 902 but has not formed desired final angles.

Turning now to FIG. 13, an illustration of a cross-sectional view of a second tool aligned over a preform between a first bagging layer and a second bagging layer and formed to a first tool of a molding system is depicted in accordance with an illustrative embodiment. In view 1300, second tool 1302 is aligned above first tool 802. Second tool 1302 comprises number of completion features 1304 configured to complete shaping of the second set of radii.

Turning now to FIG. 14, an illustration of a cross-sectional view of a second tool sealed to a second bagging layer over a preform sealed between a first bagging layer and the second bagging layer and formed to a first tool of a molding system is depicted in accordance with an illustrative embodiment. In view 1400, second tool 1302 is sealed to second bagging layer 1002. Sealing second tool 1302 to second bagging layer 1002 forms third vacuum chamber 1402.

Turning now to FIG. 15, an illustration of a cross-sectional view of a preform formed to a second tool when a third vacuum chamber between the second tool and a second bagging layer over the preform is at least partially evacuated is depicted in accordance with an illustrative embodiment. In view 1500, respective pressures within each of first vacuum chamber 810, second vacuum chamber 1004, and third vacuum chamber 1402 are controlled such that preform 902 is formed against forming surface 1502 of second tool 1302. In view 1500, the first pressure within first vacuum chamber 810 is greater than the third pressure within third vacuum chamber 1402. When the third pressure in third vacuum chamber 1402 is less than the first pressure in first vacuum chamber 810, preform 902 moves upward from first tool 802 to second tool 1302.

In view 1500, the second pressure within second vacuum chamber 1004 is controlled to control the quality of preform 902. In view 1500, the second pressure within second vacuum chamber 1004 is controlled to reduce or prevent wrinkling in preform 902 during forming.

Turning now to FIG. 16, an illustration of a cross-sectional view of trim locations to release a first tool of a molding system from a preform formed to a second tool above the first tool is depicted in accordance with an illustrative embodiment. In view 1600, cut 1602 and cut 1604 are made through first bagging layer 804 and second bagging layer 1002. cut 1602 and cut 1604 are made to release first tool 802 from second tool 1302 and preform 902. Cut 1602 is made between sealant 1606 and sealant 1608 so that first bagging layer 804 and second bagging layer 1002 contacting preform 902 are no longer sealed to first tool 802. Cut 1604 is made between sealant 1610 and sealant 1612 so that first bagging layer 804 and second bagging layer 1002 contacting preform 902 are no longer sealed to first tool 802. Following cut 1602 and cut 1604, first tool 802 may be removed.

Turning now to FIG. 17, an illustration of a preform formed to a second tool is depicted in accordance with an illustrative embodiment. Between view 1600 and view 1700, first tool 802 has been removed. In view 1700, preform 902 is treated to maintain hat-shaped 1702 cross-section 1704. In some illustrative examples, preform 902 is heated to maintain hat-shaped 1702 cross-section 1704.

The different components shown in FIGS. 2-17 may be combined with components in FIG. 1, used with components in FIG. 1, or a combination of the two. Additionally, some of the components in FIGS. 2-17 may be illustrative examples of how components shown in block form in FIG. 1 can be implemented as physical structures.

The illustration of forming preform 902 in FIGS. 8-17 is not meant to imply physical or architectural limitations to the manner in which an illustrative embodiment may be implemented. Other components in addition to or in place of the ones illustrated may be used. Some components may be unnecessary. For example, although sealing of second bagging layer 1002 and first bagging layer 804 is described as using sealant, in other illustrative examples second bagging layer 1002 and first bagging layer 804 are sealed using a rubber seal or another desirable sealant alternative.

Figure 18:
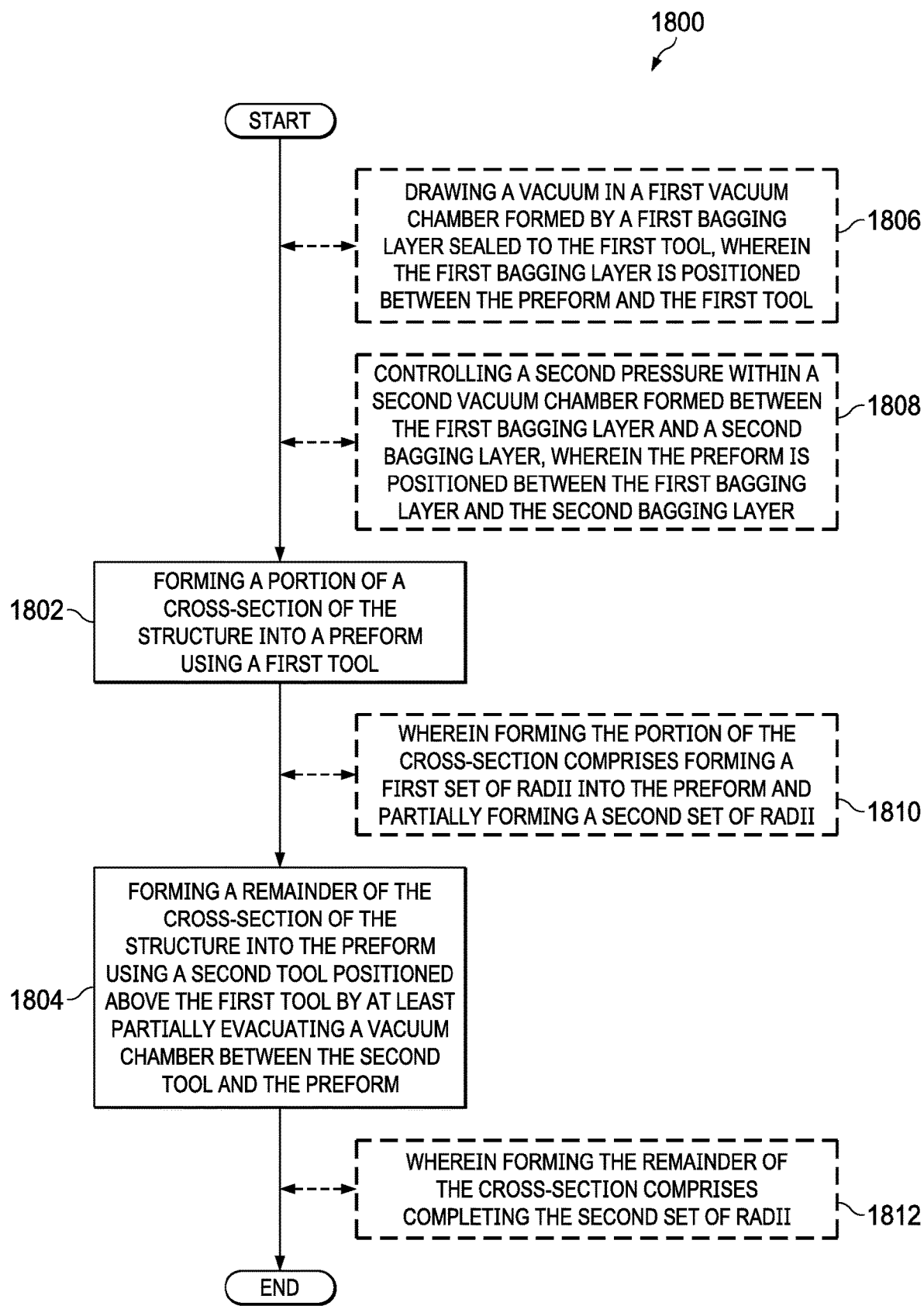
FIG. 18 is an illustration of a flowchart of a method of forming a composite structure in accordance with an illustrative embodiment.

Turning now to FIG. 18, an illustration of a flowchart of a method of forming a composite structure is depicted in accordance with an illustrative embodiment. Method 1800 may be a method of forming composite structure 188 of FIG. 1. Method 1800 may be used to form composite structure 200 of FIG. 2. Method 1800 may be performed using molding system 300 of FIG. 3. Method 1800 may be performed using first tool 400 of FIGS. 4-5. Method 1800 may be performed using second tool 600 of FIGS. 6-7. FIGS. 8-17 may be physical depictions of a molding system as method 1800 is performed.

Method 1800 forms a portion of a cross-section of the structure into a preform using a first tool (operation 1802). For example, in FIG. 1, first set of radii 112 is formed using first tool 108.

Method 1800 forms a remainder of the cross-section of the structure into the preform using a second tool positioned above the first tool by at least partially evacuating a vacuum chamber between the second tool and the preform (operation 1804). For example, in FIG. 1, second set of radii 116 is formed using second tool 118. Second set of radii 116 is formed by at least partially evacuating third vacuum chamber 180 between second tool 118 and preform 134.

In some illustrative examples, a vacuum is drawn in a first vacuum chamber formed by a first bagging layer sealed to the first tool, wherein the first bagging layer is positioned between the preform and the first tool (operation 1806). Method controls a second pressure within a second vacuum chamber formed between the first bagging layer and a second bagging layer, wherein the preform is positioned between the first bagging layer and the second bagging layer (operation 1808).

In some illustrative examples, forming the portion of the cross-section comprises forming a first set of radii into the preform and partially forming a second set of radii (operation 1810). In some illustrative examples, forming the remainder of the cross-section comprises completing the second set of radii (operation 1812).

Figure 19:
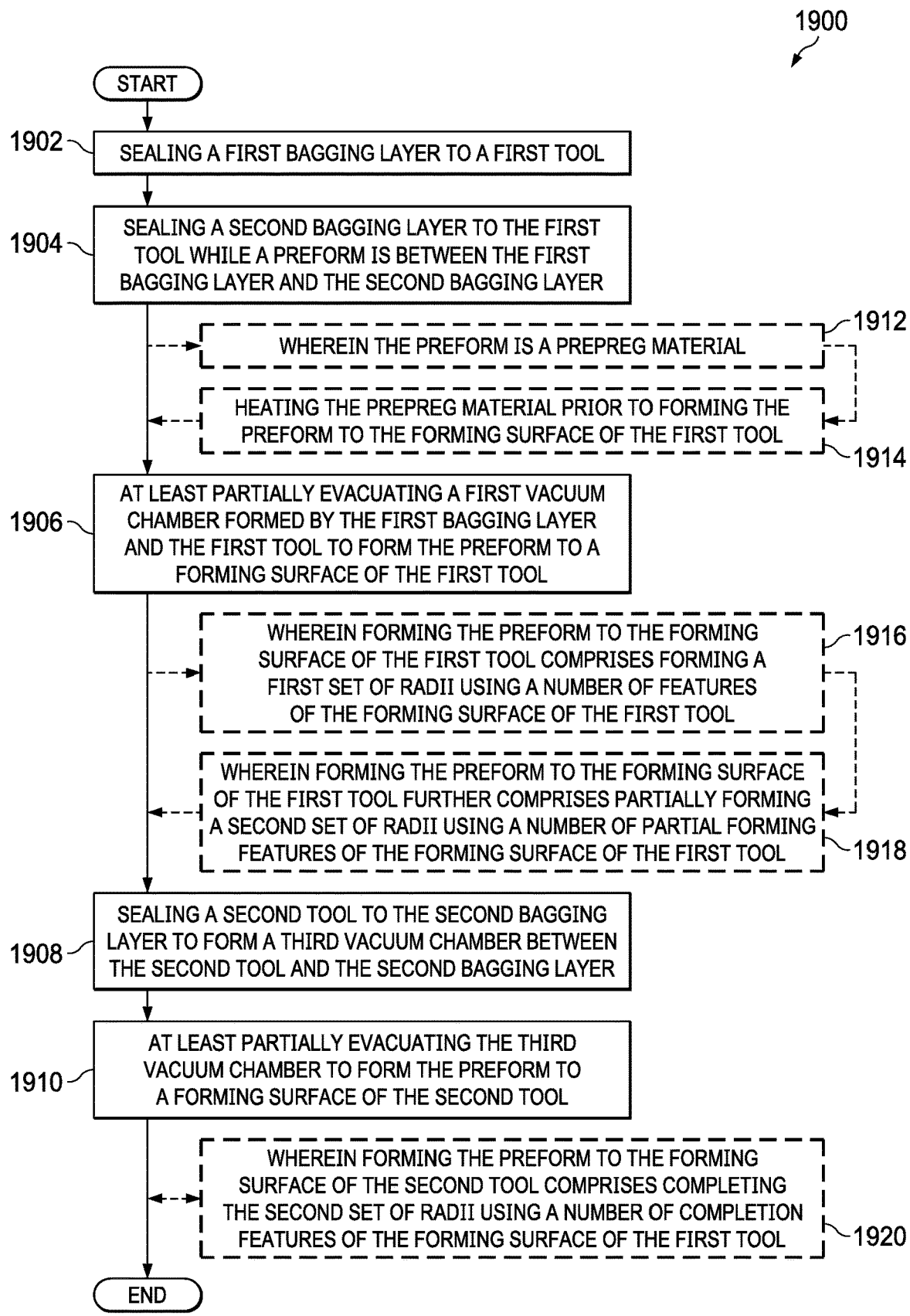
FIG. 19 is an illustration of a flowchart of a method of forming a structure in accordance with an illustrative embodiment.

Turning now to FIG. 19, an illustration of a flowchart of a method of forming a structure is depicted in accordance with an illustrative embodiment. Method 1900 may be a method of forming composite structure 188 of FIG. 1. Method 1900 may be used to form composite structure 200 of FIG. 2. Method 1900 may be performed using molding system 300 of FIG. 3. Method 1900 may be performed using first tool 400 of FIGS. 4-5. Method 1900 may be performed using second tool 600 of FIGS. 6-7. FIGS. 8-17 may be physical depictions of a molding system as method 1900 is performed.

Method 1900 seals a first bagging layer to a first tool (operation 1902). Method 1900 seals a second bagging layer to the first tool while a preform is between the first bagging layer and the second bagging layer (operation 1904). Method 1900 at least partially evacuates a first vacuum chamber formed by the first bagging layer and the first tool to form the preform to a forming surface of the first tool (operation 1906). Method 1900 seals a second tool to the second bagging layer to form a third vacuum chamber between the second tool and the second bagging layer (operation 1908). Method 1900 at least partially evacuates the third vacuum chamber to form the preform to a forming surface of the second tool (operation 1910).

In some illustrative examples, forming the preform to the forming surface of the first tool comprises forming a first set of radii using a number of features of the forming surface of the first tool (operation 1916). As used herein, a "set" of items is one or more items. Thus, a first set of radii includes one or more radii. In some illustrative examples, forming the preform to the forming surface of the first tool further comprises partially forming a second set of radii using a number of partial forming features of the forming surface of the first tool (operation 1918).

In some illustrative examples, forming the preform to the forming surface of the second tool comprises completing the second set of radii using a number of completion features of the forming surface of the second tool (operation 1920). In some illustrative examples, the first tool is a male mold and the second tool is a female mold.

In some illustrative examples, the preform is a prepreg material (operation 1912), and method 1900 heats the prepreg material prior to forming the preform to the forming surface of the first tool (operation 1914).

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram. Some blocks may be optional. For example, operation 1806 through operation 1812 of FIG. 18 may be optional. As another example, operation 1912 through operation 1920 of FIG. 19 may be optional.

Figure 20:
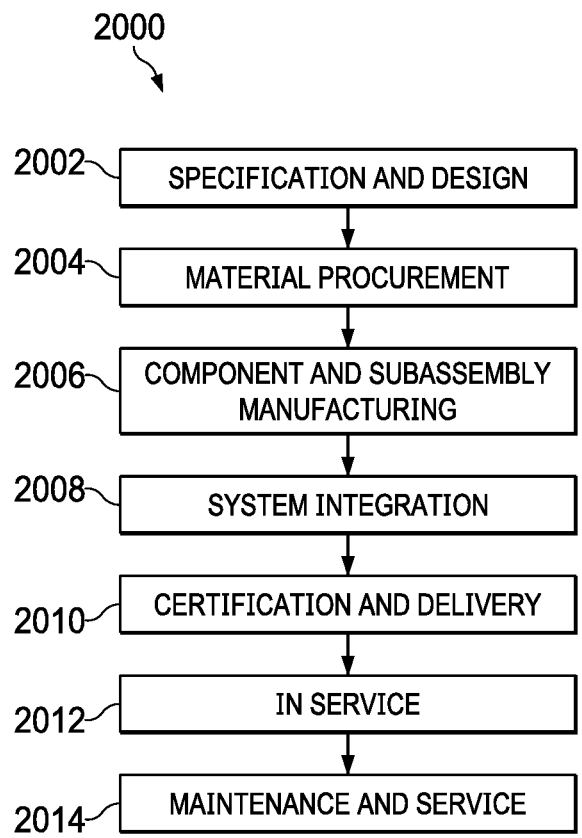
FIG. 20 is an illustration of a block diagram of an aircraft manufacturing and service method in accordance with an illustrative embodiment.
Figure 21:
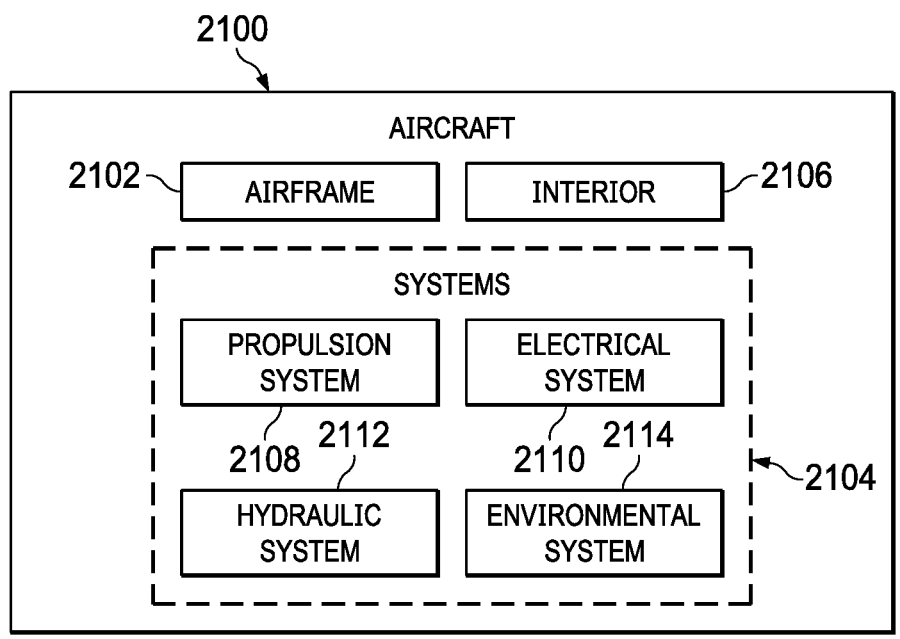
FIG. 21 is an illustration of a block diagram of an aircraft in which an illustrative embodiment may be implemented.

Illustrative embodiments of the present disclosure may be described in the context of aircraft manufacturing and service method 2000 as shown in FIG. 20 and aircraft 2100 as shown in FIG. 21. Turning first to FIG. 20, an illustration of an aircraft manufacturing and service method is depicted in accordance with an illustrative embodiment. During preproduction, aircraft manufacturing and service method 2000 may include specification and design 2002 of aircraft 2100 in FIG. 21 and material procurement 2004.

During production, component and subassembly manufacturing 2006 and system integration 2008 of aircraft 2100 takes place. Thereafter, aircraft 2100 may go through certification and delivery 2010 in order to be placed in service 2012. While in service 2012 by a customer, aircraft 2100 is scheduled for routine maintenance and service 2014, which may include modification, reconfiguration, refurbishment, or other maintenance and service.

Each of the processes of aircraft manufacturing and service method 2000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 21, an illustration of an aircraft is depicted in which an illustrative embodiment may be implemented. In this example, aircraft 2100 is produced by aircraft manufacturing and service method 2000 of FIG. 20 and may include airframe 2102 with plurality of systems 2104 and interior 2106. Examples of systems 2104 include one or more of propulsion system 2108, electrical system 2110, hydraulic system 2112, and environmental system 2114. Any number of other systems may be included.

Apparatuses and methods embodied herein may be employed during at least one of the stages of aircraft manufacturing and service method 2000. One or more illustrative embodiments may be used during at least one of component and subassembly manufacturing 2006, system integration 2008, or maintenance and service 2014 of FIG. 20. For example, the illustrative examples could be used during component and subassembly manufacturing 2006 to assemble a composite stiffener, such as composite structure 188. For example, method 1800 may be used during component and subassembly manufacturing 2006 to form hat-shaped 154 cross-section 156 in composite structure 188. Method 1800 may be used to manufacture a portion of airframe 2102 of aircraft 2100. As another example, method 1900 may be used during component and subassembly manufacturing 2006 to form hat-shaped 154 cross-section 156 in composite structure 188. Method 1900 may be used to manufacture a portion of airframe 2102 of aircraft 2100.

The illustrative examples provide a cost-effective means of fabricating complex shapes into composite structures. In one illustrative example, a hat-shaped cross-section is produced in a stiffener. The illustrative examples provide reduced labor costs. The illustrative examples enable higher deposition rates through flat layup, which could be potentially automated. The illustrative examples enable increased production rates for composite structure with complex cross-sections.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of forming a structure comprising:
   forming a portion of a cross-section of the structure into a preform using a first tool by drawing a vacuum in a first vacuum chamber formed by a first bagging layer sealed to the first tool, wherein the preform is positioned in a second vacuum chamber between the first bagging layer and a second bagging layer, the second vacuum chamber formed by sealing the second bagging layer to the first tool;
   after forming the portion of the cross-section of the structure, sealing a second tool to the second bagging layer to form a third vacuum chamber; and
   forming a remainder of the cross-section of the structure into the preform using the second tool positioned above the first tool by at least partially evacuating the third vacuum chamber between the second tool and the second bagging layer, wherein a pressure in the third vacuum chamber is less than a pressure in the first vacuum chamber.

2. The method of claim 1 further comprising:
   controlling a pressure within the second vacuum chamber formed between the first bagging layer and the second bagging layer during forming the portion of the cross-section and during forming the remainder of the cross-section to reduce or prevent wrinkling in the preform.

3. The method of claim 1, wherein forming the portion of the cross-section comprises forming a first set of radii into the preform and partially forming a second set of radii.

4. The method of claim 3, wherein the second tool is a female mold having a trough configured to support the first set of radii.

5. The method of claim 3, wherein forming the remainder of the cross-section comprises completing the second set of radii.

6. The method of claim 1, wherein forming the portion of the cross-section of the structure into the preform using the first tool comprises using a number of features of a forming surface of the first tool.

7. The method of claim 6, wherein forming the portion of the cross-section of the structure into the preform using the first tool further comprises using a number of partial forming features of the forming surface of the first tool.

8. The method of claim 7, wherein forming the remainder of the cross-section of the structure into the preform using the second tool comprises using a number of completion features of a forming surface of the second tool.

9. The method of claim 1, wherein the first tool is a male mold and the second tool is a female mold.

10. The method of claim 1, wherein the preform is a prepreg material and wherein the method further comprises:
    heating the prepreg material prior to forming the portion of the cross-section of the structure into the preform using the first tool.

11. The method of claim 1, wherein when the pressure in third vacuum chamber is less than the pressure in first vacuum chamber, the preform moves from the first tool to the second tool.

12. The method of claim 1, wherein the first tool has a first contour and the second tool has a second contour, wherein the first contour is different from the second contour.

13. A method of forming a structure comprising:
    sealing a first bagging layer to a first tool to form a first vacuum chamber between the first bagging layer and the first tool;
    positioning a preform on the first bagging layer;
    sealing a second bagging layer to the first tool while the preform is between the first bagging layer and the second bagging layer to form a second vacuum chamber between the first bagging layer and the second bagging layer;
    evacuating the second vacuum chamber;
    at least partially evacuating the first vacuum chamber formed by the first bagging layer and the first tool to completely form a first set of radii of the preform and partially form a second set of radii of the preform to a forming surface of the first tool;
    sealing a second tool to the second bagging layer to form a third vacuum chamber between the second tool and the second bagging layer; and
    at least partially evacuating the third vacuum chamber, wherein a pressure in the third vacuum chamber is less than a pressure in the first vacuum chamber, to complete forming the second set of radii of the preform to a forming surface of the second tool.

14. The method of claim 13, wherein completely forming the first set of radii comprises using a number of features of the forming surface of the first tool.

15. The method of claim 14, wherein partially forming the second set of radii comprises using a number of partial forming features of the forming surface of the first tool.

16. The method of claim 15, wherein complete forming the second set of radii comprises using a number of completion features of the forming surface of the second tool.

17. The method of claim 13, wherein the first tool is a male mold and the second tool is a female mold.

18. The method of claim 13, wherein the preform is a prepreg material, and wherein the method further comprises:
   heating the prepreg material prior to completely forming the first set of radii of the preform and partially forming the second set of radii of the preform to the forming surface of the first tool.

19. The method of claim 13 further comprising:
   controlling a pressure within the second vacuum chamber formed between the first bagging layer and the second bagging layer during the formation of the first set of radii of the preform and during the completion of forming the second set of radii to reduce or prevent wrinkling in the preform.

20. The method of claim 13, wherein the first tool has a first contour and the second tool has a second contour, wherein the first contour is different from the second contour.

* * * * *